Aug. 6, 1940.   R. A. GOELLER   2,209,966
DIFFERENTIAL GEARING
Filed Sept. 7, 1938   2 Sheets-Sheet 1

INVENTOR
Robert A. Goeller
BY
Marshall A. Hawley
ATTORNEYS

Aug. 6, 1940.  R. A. GOELLER  2,209,966
DIFFERENTIAL GEARING
Filed Sept. 7, 1938  2 Sheets-Sheet 2
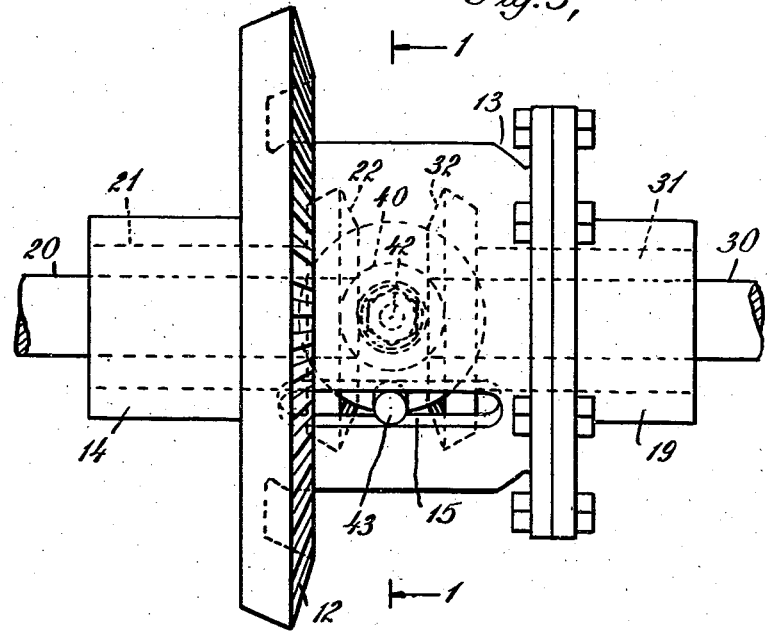
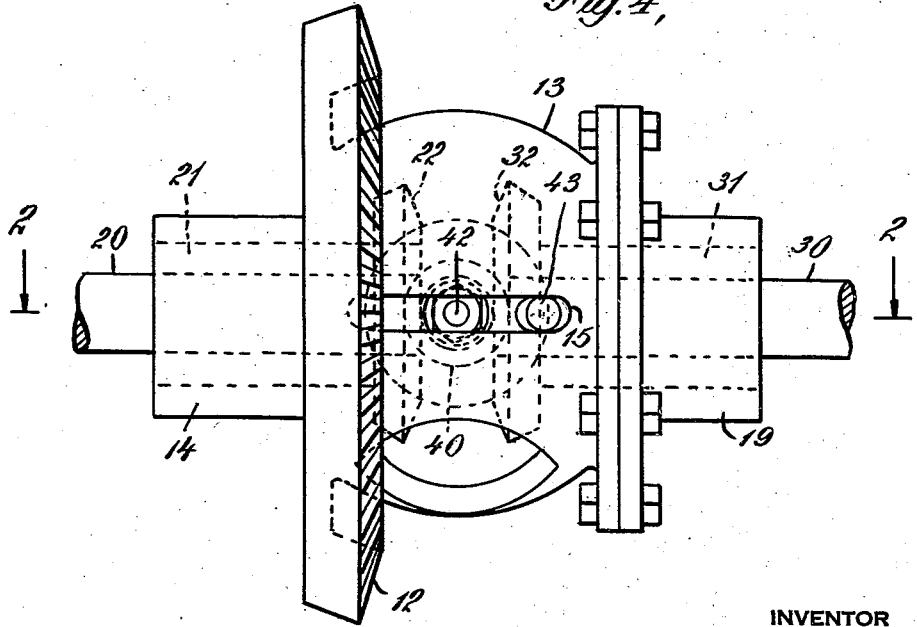
INVENTOR
Robert A. Goeller
BY
Marshall O. Hawley
ATTORNEYS Patented Aug. 6, 1940

2,209,966

UNITED STATES PATENT OFFICE 2,209,966

DIFFERENTIAL GEARING

Robert A. Goeller, Larchmont, N. Y.

Application September 7, 1938, Serial No. 228,746

8 Claims. (Cl. 74—315)

This invention relates to improvements in differential gearing of the type for interconnecting a driving shaft with two driven shafts, the rotation of which may not be uniform. Gearing of this character is commonly used in motor driven vehicles, but it is subject to the objectionable feature of transmitting the greater part or all of the rotation of the driving shaft to the axle of the wheel having the lesser or no ground traction, thereby transmitting little or no torque to the opposite wheel. Thus, when one of two driving wheels runs onto a slippery surface, such as one coated with ice, the driving shaft will spin it around without transmitting an effective force to the other wheel. An extreme example of this difficulty is the effect of a broken axle which will be spun around freely without any power being transmitted to the opposite wheel so that a motor driven vehicle with one broken axle is helpless.

One of the objects of this invention is to overcome this serious difficulty and to provide differential gearing through which the power of the engine is always available to drive a wheel which has ground traction regardless of the condition of the other wheel or of its axle. Another object is to so construct the gearing that in the event of a wheel on one side of the vehicle losing all of its ground traction or in the event of its axle breaking, the whole power of the driving shaft will still be transmitted to the opposite wheel.

Another object is to provide gearing through which a greater amount of the driving power will be transmitted to the wheel having the greater ground traction or load.

A still further object is to provide a simple self-contained and inexpensive construction or arrangement of parts which will cooperate automatically to attain the desired results.

These and other objects will appear from the following specification in which I will describe the invention, the novel features of which will be pointed out in the appended claims.

Referring to the drawings:

Fig. 3 is a front elevation of the device shown in the other figures;

Fig. 4 is a view similar to Fig. 3 with the parts shown in different relative positions.

Figure 1:
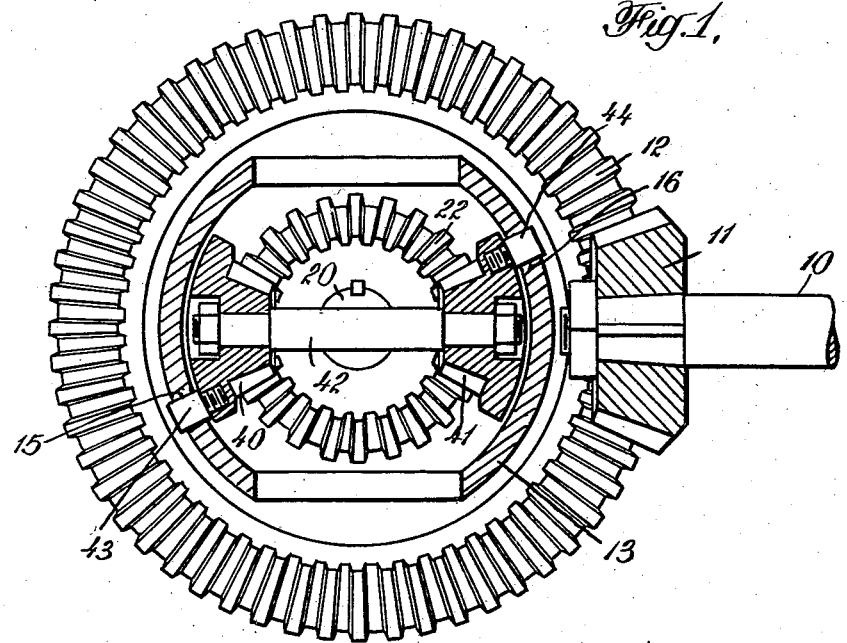
Fig. 1 is a side elevation, partly in section, of differential gearing which is made according to and embodies my invention, the section being taken on the line 1—1 of Fig. 3.

10 designates a driving shaft to which a driving pinion 11 is affixed. This pinion is in mesh with a ring gear 12 which, as shown, is integral with a rotatable housing 13.

20 and 30 are wheel axles supported in a housing (not shown) in the usual manner. 21 and 31 are the hubs of driven bevel gears 22, 32 keyed to the shafts 20 and 30 respectively. The ring gear housing 13 has a hub 14 which is rotatably supported on the hub 21. So far the parts are similar to the construction used in standard automobile practice. In this case the usual spider gears which interconnect the driving gears 22, 32 are replaced by bevel pinions 40, 41 centrally mounted on a cross-shaft 42 which spaces them to mesh properly with the driven gears 22, 32, but which are crowned to extend beyond the teeth of the pinion and the teeth of the driven gears to support stub shafts 43, 44 which project outwardly in alignment with the pitch lines of the gears 40, 41 on the same side of cross shaft 42.

Figure 2:
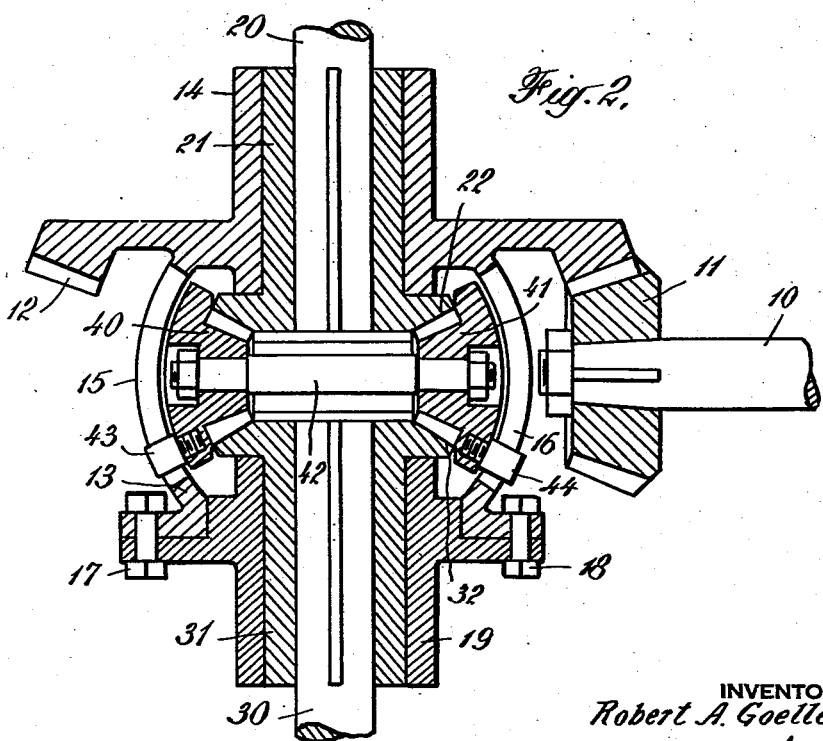
Fig. 2 is a sectional plan view of the parts shown in Fig. 1, the section being taken on the line 2—2 of Fig. 4.

The stub shafts 43 and 44 extend respectively into slots 15 and 16 in extensions of the ring gear housing which slots are parallel with the axis of the axles 20 and 30 (Figs. 1, 3 and 4) but arcuate in a plane at right angles to said axis (Fig. 2). The extensions of the ring gear housing are bolted at 17 and 18 to a flange which extends outwardly from a hub 19 rotatably supported on the hub 31 on axle 30.

The rotation of the ring gear will thus be transmitted through its extensions and the slots therein, the stub shafts 43, 44 and pinions 40, 41 to move the cross shaft 42 bodily around the axis of the axles 20, 30 and thereby drive the gears 22, 32 and axles 20, 30. When the stub shafts are in the center of the slots (see pin 43 and slot 15 in Fig. 3) the torque will be transmitted equally to the two axles 20 and 30.

These axles 20 and 30 are capable of relative movement as when caused by the vehicle running on a curve or by unequal slipping of the vehicle wheels on the ground. This will cause the pinions 40, 41 to rotate and the stub shafts 43, 44 to move laterally in the same direction in the slots 15 and 16. If the wheel on axle 20 meets an obstruction which causes it to leave the ground momentarily, the stub shaft 43 will move to the right hand end of slot 15, as shown in Fig. 4. The stub shaft 43 will then be in the pitch line of the gear 32 and the pinion 40 and gear 32 will be held against further relative movement as will also the pinion 41 and the gear 22. The free wheel therefore cannot spin with the resultant shock to the driving mechanism when it again reaches the ground, but there will always be a complete and positive engagement of the parts between the driving shaft and the driven gears 22 and 32.

Let us assume the extreme condition, that the axle 20 is broken. The same result will be effected and the whole power of the driving shaft will be transmitted to the wheel on axle 30 directly. This is a result which cannot be attained by the arrangement shown in United States Patent No. 1,888,656, issued to F. L. Boynton, November 22, 1932.

When the shaft 43 moves to the right in slot 15, the stub shaft 44 moves to the right in slot 16. As soon as stub shafts 43, 44 move to the right from the center of the slots 15 and 16, the driving force is tranmitted to the gear 32 by a greater leverage than it is to gear 22 and the ratio of this leverage increases until the stub shafts reach the ends of the slots when the driving power is transmitted by the maximum leverage to gear 32 through stub shafts 43, 44 and pinions 40, 41 which are then locked to gear 32.

Under this condition, the axle 20 cannot spin even if it is broken, as the pinions 40, 41 cannot then rotate on shaft 42, so that gear 22 must rotate in unison with gear 32.

When the relative movement of the axles 20 and 30 continues for some time, the stub shafts 43, 44 will oscillate in their respective slots 15, 16, but at no time will the positive engagement between the driving and driven parts be interrupted. During such oscillation the drive is transmitted in varying degrees of leverage. When the stub shafts are on the common pitch line of the driving pinions and one of the driven gears, the whole power of the motor will be transmitted to that gear directly. As the stub shafts move away from this position of maximum leverage, points at which the power is transmitted through them are shifted gradually toward the other wheel. Upon reaching the center of the slots 15 and 16 their action on the two vehicle wheels is equal.

With this arrangement applied to a motor driven vehicle, the power of the motor is always available to drive it if either of the driven wheels has any ground traction. Strains on the driving mechanism are minimized, smoother riding is attained and in slippery weather there is less need of skid chains.

Modifications in construction and arrangement of parts herein shown for the purpose of illustrating an embodiment of the invention, may be made within its spirit and scope and I intend no limitations other than those imposed by the appended claims.

What I claim is:

1. Differential gearing comprising a pair of inwardly facing driven bevel gears on a common axis, a driving bevel pinion on an axis transverse to that of the driven gears, in mesh with the driven gears, means for rotating the driving pinion bodily about the axis of the driven gears, said means comprising a member rotatable about the axis of the driven gears, constructed with a slot parallel with the axis of the driven gears, and a stub shaft projecting into said slot from the driving pinion, said parts being so constructed and arranged that the stub shaft can move into alinement with pitch lines of the driven gears.

2. Differential gearing comprising a pair of inwardly facing driven bevel gears on a common axis, a driving bevel pinion on an axis transverse to that of the driven gears, in mesh with the driven gears, means for rotating the driving pinion bodily about the axis of the driven gears, said means comprising a driving frame spanning the driven gears and supported to rotate about the axis of the driven gears, said frame being constructed with a slot parallel with the axis of the driven gears, and a stub shaft projecting into said slot from the driving pinion, said parts being so constructed and arranged that the stub shaft can move into alinement with pitch lines of the driven gears.

3. Differential gearing comprising a pair of inwardly facing driven bevel gears on a common axis, a driving bevel pinion on an axis transverse to that of the driven gears, in mesh with the driven gears, means for rotating the driving pinions bodily about the axis of the driven gears, said means comprising a member rotatable about the axis of the driven gears constructed with a slot parallel with the axis of the driven gears, said pinion having a portion extending outwardly beyond its teeth and the teeth of the driven gears, and a stud shaft projecting from said extending portion into the slot in the frame, said parts being so constructed and arranged that the stub shaft can move into alinement with pitch lines of the driven gears.

4. Differential gearing comprising a pair of inwardly facing driven bevel gears on a common axis, a pair of driving bevel pinions on an axis transverse to that of the driven gears, in mesh with the driven gears, means for rotating the driving pinions bodily about the axis of the driven gears, said means comprising a member rotatable about the axis of the driven gears constructed with slots parallel with the axis of the driven gears, and a stub shaft projecting into one of said slots from each driving pinion, said parts being so constructed and arranged that the stub shafts can move into alinement with pitch lines of the driven gears.

5. Differential gearing comprising a pair of inwardly facing driven bevel gears on a common axis, a pair of driving bevel pinions on an axis transverse to that of the driven gears, in mesh with the driven gears, means for rotating the driving pinions bodily about the axis of the driven gears, said means comprising a member rotatable about the axis of the driven gears, constructed with slots parallel with the axis of the driven gears, and a stub shaft projecting into one of said slots from each driving pinion, so disposed relatively as to move in step with each other in their respective slots, said parts being so constructed and arranged that the stub shafts can move into alinement with pitch lines of the driven gears.

6. Differential gearing comprising a pair of inwardly facing driven bevel gears on a common axis, a pair of driving bevel pinions on a cross shaft transverse to the axis of the driven gears, said pinions being in mesh with the driven gears, means for rotating the driving pinions and their cross shaft bodily about the axis of the driven gears, said means comprising a driving frame spanning the driven gears and supported to rotate about the axis of the driven gears, said frame being constructed with slots parallel with the axis of the driven gears, and a stub shaft projecting into one of said slots from each driving pinion, so disposed relatively as to move in step with each other in their respective slots, said parts being so constructed and arranged that the stub shafts can move into alinement with pitch lines of the driven gears.

7. Differential gearing comprising a pair of inwardly facing driven bevel gears on a common axis, a pair of driving bevel pinions on an axis transverse to that of the driven gears, in mesh with the driven gears, means for rotating the driving pinions bodily about the axis of the driven gears, said means comprising a driving frame spanning the driven gears and supported to rotate about the axis of the driven gears, said frame being constructed with slots parallel with the axis of the driven gears, each pinion having a portion extending outwardly beyond its teeth and the teeth of the driven gears and a stub shaft projecting from said extending portion into one of the slots in the frame, said parts being so constructed and arranged that the stub shafts can move into alinement with pitch lines of the driven gears.

8. Differential gearing comprising a pair of inwardly facing driven bevel gears on a common axis, a pair of driving bevel pinions on a cross shaft transverse to the axis of the driven gears, in mesh with the driven gears, means for rotating the driving pinions bodily about the axis of the driven gears, said means comprising a driving frame spanning the driven gears and supported to rotate about the axis of the driven gears, said frame being constructed with slots parallel with the axis of the driven gears, each pinion having a portion extending outwardly beyond its teeth and the teeth of the driven gears and a stub shaft projecting from said extending portion into one of the slots in the frame, said stub shafts being so disposed relatively as to move in step with each other in their respective slots, said parts being so constructed and arranged that the stub shafts can move into alinement with pitch lines of the driven gears.

ROBERT A. GOELLER.